T. DUGAN.
COMBINED HEADER AND THRESHER.
APPLICATION FILED FEB. 14, 1912.

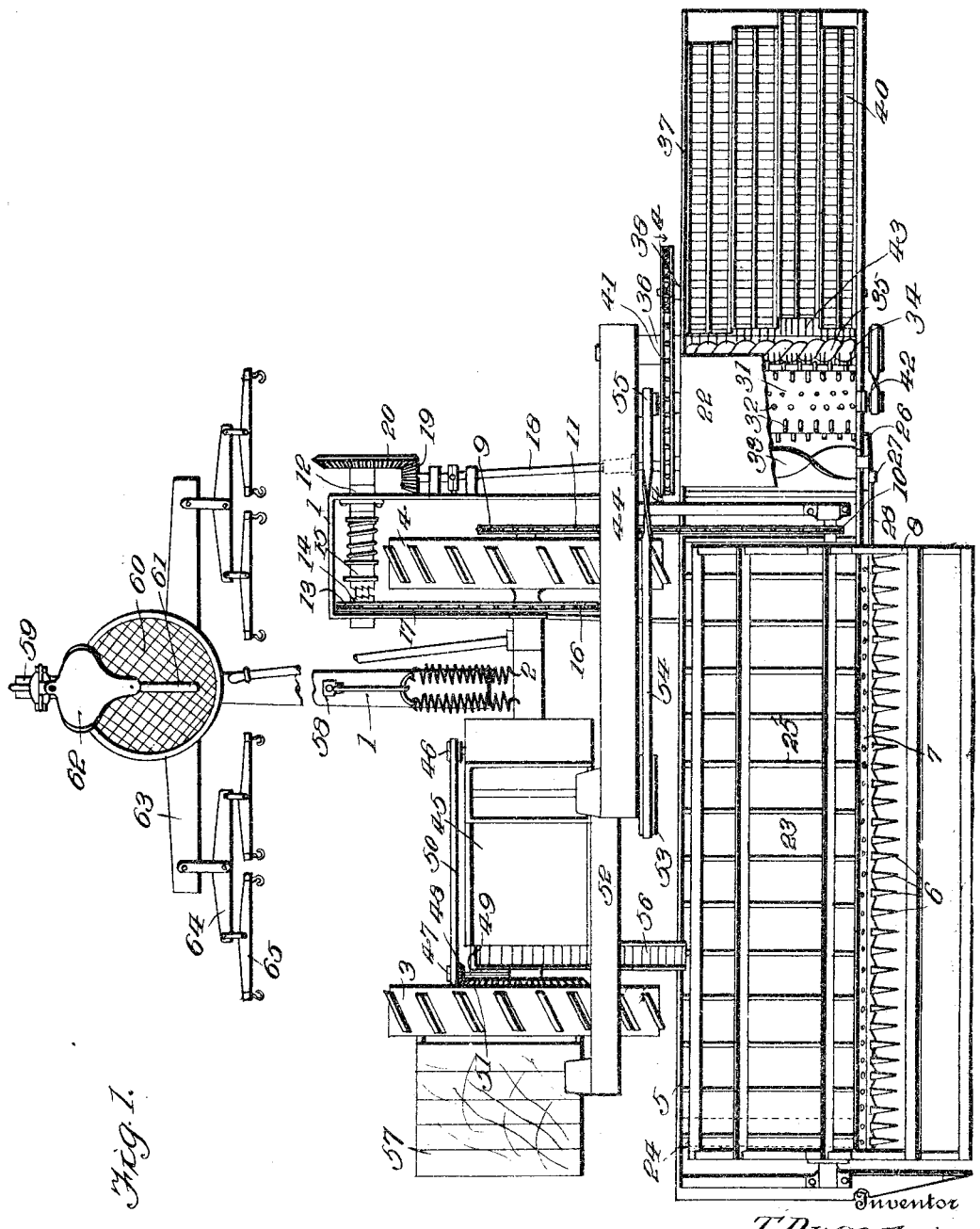

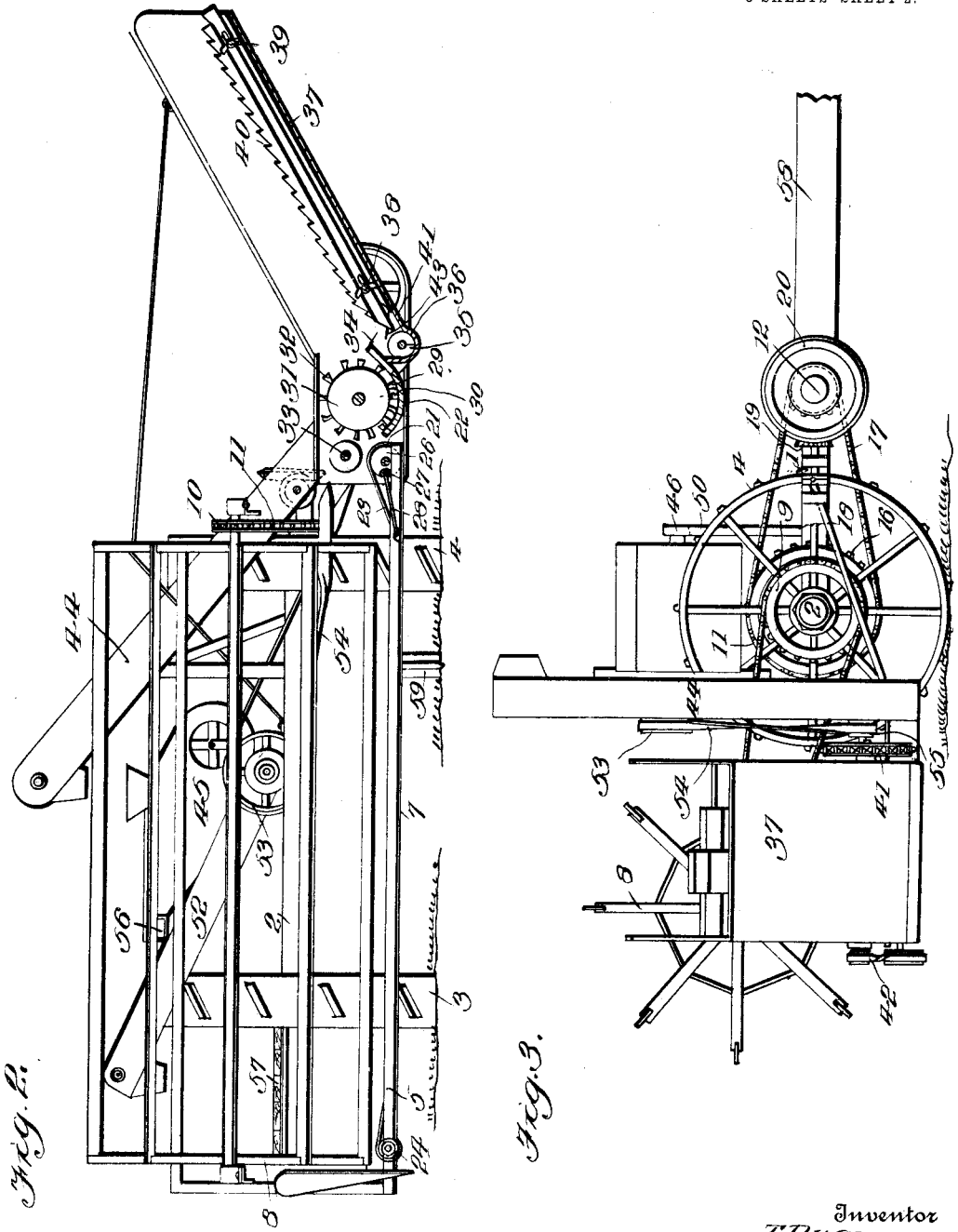

1,051,491.

Patented Jan. 28, 1913.

3 SHEETS—SHEET 3.

Witnesses

Inventor
T. Dugan.
By
A. R. Dacey, Attorney

UNITED STATES PATENT OFFICE.

THOMAS DUGAN, OF WICHITA, KANSAS, ASSIGNOR OF ONE-FOURTH TO GOTTLIEB FUDICKAR, OF WICHITA, KANSAS.

COMBINED HEADER AND THRESHER.

1,051,491.   Specification of Letters Patent.   Patented Jan. 28, 1913.

Application filed February 14, 1912. Serial No. 677,525.

*To all whom it may concern:*

Be it known that I, THOMAS DUGAN, a citizen of the United States, residing at Wichita, in the county of Sedgwick and State of Kansas, have invented certain new and useful Improvements in Combined Headers and Threshers, of which the following is a specification.

This invention has relation to combined headers and threshers, and has for its object to provide in a single machine means for removing the heads of grain from standing stalks, together with means for carrying the said heads after they have been severed to a thresher which is mounted upon the frame of the machine.

In the thresher the heads are operated upon, whereby the kinds of grain are knocked out of the chaff and the said kernels are delivered to a conveyer which carries them to a cleaning device. The particles of straw and the major portions of the denuded heads are ejected from the thresher mechanism by a suitable means provided for this purpose. From the cleaning mechanism the grain is delivered to a conveyer which is arranged to elevate the same and from which the grain may be deposited in bags or other receptacles. The lighter chaff and dust, etc., is separated from the grain at the cleaner and is ejected from the same. Any unthreshed heads that should arrive at the cleaner will be delivered back upon the conveyer which receives the heads immediately after they are severed from the stalks and these unthreshed heads are again passed through the thresher mechanism. The machine is supported in part upon traction wheels which are operatively connected with the operating parts of the several mechanisms and the several mechanisms are so arranged that the weight of the body portion of the machine as an entirety is balanced or approximately balanced upon the said traction wheels. A tongue extends rearwardly from the frame of the combined machine and is supported at its rear end by a dirigible caster wheel. The draft animals are connected with the rear portion of the said tongue and are so positioned that they follow behind the frame of the machine as the same is moved over the ground.

Further objects and advantages will appear in the following description, it being understood that various changes in form, proportions and minor details of construction may be resorted to within the scope of the appended claims.

Figure 4:
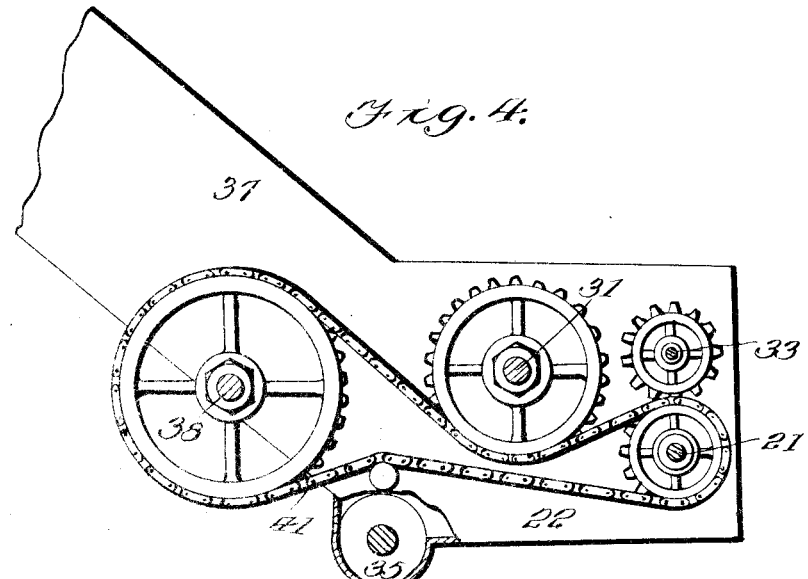
Figure 5:
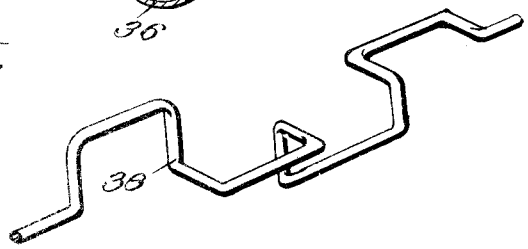
Figure 6:
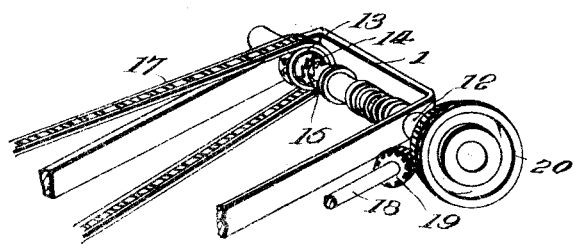

For a full understanding of the invention reference is to be had to the following description and accompanying drawings, in which:

Figure 1 is a top plan view of the combined header and thresher; Fig. 2 is a front elevation of the same with parts in section; Fig. 3 is a side elevation of the same with parts removed and parts broken away; Fig. 4 is a detail elevation of parts of the machine, illustrating a manner in which movable members may be operatively connected together; Fig. 5 is a perspective view of a crank shaft used in the machine; Fig. 6 is a perspective view of part of the frame of the machine, showing operating parts mounted thereon.

Corresponding and like parts are referred to in the following description and indicated in all the views of the accompanying drawings by the same reference characters.

The frame of the machine, indicated in general at 1, is supported upon a forward axle 2. Traction wheels 3 and 4 are journaled upon the axle 2 at the opposite ends thereof. A conveyer trunk 5 is supported at the forward portion of the frame 1 and is also in advance of the traction wheels 3 and 4 and extends transversely across the same. Guard fingers 6 are mounted at the forward portion of the trunk 5 and a knife bar 7 is mounted for reciprocation transversely of the said fingers 6. A reel 8 is journaled for rotation above the cutting apparatus of which the fingers 6 and the knife bar 7 are component parts. A sprocket wheel 9 is fixed to the hub of the traction wheel 4 and a sprocket wheel 10 is fixed to the shaft of the reel 8. A sprocket chain 11 is trained around the sprocket wheels 9 and 10 and is adapted to transmit rotary movement from the traction wheel 4 to the reel 8.

A shaft 12 is journaled for rotation at the rear portion of the frame 1 and a sprocket wheel 13 is loosely mounted thereon. The said sprocket wheel 13 is provided with a clutch hub 14. A clutch member 15 is slidably mounted upon the shaft 12 but is constrained to rotate in unison with the same. Any suitable lever mechanism (not shown) may be provided for shifting the clutch member 15 to carry the same into engagement with the clutch hub 14 or to move the same out of engagement therewith.

A sprocket wheel 16 is fixed to the hub of the traction wheel 4 and a sprocket chain 17 is trained around the sprocket wheels 13 and 16 and is adapted to transmit rotary movement from the traction wheel 4 to the sprocket wheel 13. Therefore it will be seen that when the clutch member 15 is moved into engagement with the clutch hub 14 of the wheel 13 that the shaft 12 is caused to rotate in unison with the said sprocket wheel 13.

A shaft 18 (made up of sections connected together by a universal joint) is journaled for rotation at the side of the frame 1 and carries at its rear end a beveled pinion 19 which meshes with a beveled gear wheel 20 fixed to the end of the shaft 12. The shaft 18 is connected at its forward end with the shaft of a roller 21 which is journaled in the casing of a thresher, indicated in general at 22. This thresher is located at the delivery end of the trunk 5. A conveyer belt 23 is trained around the roller 21 and a similar roller 24 is journaled at the opposite end of the trunk 5. The belt 23 is provided upon its outer face with a series of slats 25 and the upper run of the belt is arranged to travel immediately behind the cutting apparatus of which the guard fingers 6 and the knife bar 7 form component parts.

A disk 26 is fixed to the forward end of the shaft of the roller 21 and is provided with an eccentrically positioned pin 27. A pitman 28 is pivoted at one end upon the pin 27 and at its other end is pivotally connected with the knife bar 7. Therefore it will be seen that as the roller 21 rotates and the belt 23 is moved in an orbit the knife bar 7 is reciprocated transversely with relation to the guard fingers 6. Thus means is provided for operating the conveyer belt and the cutting apparatus simultaneously.

The thresher casing 22 is provided with a concave 29 which in turn is provided with teeth 30 of usual pattern. A cylinder 31 is journaled in the thresher casing 22 and is provided upon its periphery with teeth 32 which are adapted to coöperate with the teeth 30 in knocking the kernels of grain from the heads.

A distributer 33 is journaled in the thresher casing 22 above the roller 21. This distributer is in the form of a blade twisted spirally and is adapted to engage the material as it is brought toward the thresher casing by the conveyer belt 23 and distribute the same along the cylinder and concave, thereby preventing said material from being presented to the said cylinder and concave at a single point.

Spaced fingers 34 are located at the delivery end of the concave 29 and are adapted to prevent the straw from falling down upon a worm auger 35 which is journaled in a trough 36 at the outer end portion of the casing 22.

An elevator trunk 37 is mounted at the delivery end of the thresher casing 22 and is provided with upper and lower crank shafts 38 and 39. Rack bars 40 are mounted upon the cranks of the shafts 38 and 39 and are adapted to reciprocate as the said shafts rotate, whereby the straw deposited upon the said bars is elevated and eventually ejected from the upper outer end of the trunk 37. The shafts of the cylinder 31, distributer 33 and the shaft 38 are provided with sprocket wheels and a chain 41 is suitably trained about the said sprocket wheels so that the said parts are rotated from the roller 21.

A crossed belt 42 operatively connects the cylinder 31 with the worm auger 35. The rack bars 40 are provided at their lower ends with spaced fingers 43 which assist the fingers 34 in preventing the straw from falling down upon the auger 35. The rear end of the trough 36 enters the lower end of an elevator trunk 44 in which is mounted a suitable belt elevator of usual pattern (not shown) and which is operated by the auger 35.

A cleaning fan 45 is mounted upon the frame 1 and is located below the delivery end of the elevator trunk 44. The shaft of the fan 45 is provided with a pulley 46 and a pulley 47 is fixed to a beveled pinion 48 which is journaled upon the arm 49 carried by the frame of the machine. A belt 50 is trained around the pulleys 46 and 47. The pinion 48 meshes with a beveled gear wheel 51 which is attached to the side of the traction wheel 3. The casing of the fan 45 is arranged to deliver the cleaned grain into the elevator trunk 52 which incloses a suitable elevator belt (not shown). The said belt is moved by a pulley 53 which is operatively connected therewith in any suitable manner and which is driven by a crossed belt 54 which also passes around a pulley 55 mounted upon the shaft of the cylinder 31. The fan 45 is located between the traction wheels 3 and 4 and the said fan is provided with a delivery chute 56 which is adapted to receive the unthreshed heads of grain. The said unthreshed heads of grain are adapted to pass along the said chute and fall upon the outer end of the conveyer belt 23 which will carry the said heads back and pass them again through the said threshing mechanism.

The elevator trunk 52 has its delivery end disposed over a platform 57 which is supported beyond the outer side of the traction wheel 3 and upon this platform bags or other suitable receptacles may be provided for the reception of the grain as it is delivered from the trunk 52.

The forward end of a tongue 58 is connected with the axle 2 and the rear end of the said tongue is supported by a caster wheel 59. An operator's platform 60 is mounted upon the rear portion of the tongue 58 and a tiller 61 is located above the said platform and is connected with the shaft of the frame in which the wheel 59 is journaled. An operator's seat 62 is mounted upon the said tiller. As the machine is passing over the ground the operator pulls the tiller 61 between his legs and by swaying his body to one side or the other the frame of the caster wheel 59 is swung so that the machine may be guided over the ground.

A tree 63 is supported at the rear end portion of the tongue 58 and carries at its end portions doubletrees 64 which in turn support swingletrees 65. It is to these swingletrees that the draft animals are attached and they are arranged with one pair at each side of the tongue 58.

From the above description the operation of the combined header, thresher and cleaner is apparent, and the parts are so arranged and positioned with relation to the supporting traction wheels that the machine is practically balanced upon the said wheels so that there will be little or no tendency of the machine tilting or tipping to one side or the other. The cutting apparatus and the conveyer trunk immediately behind the same extend transversely across the fronts of the traction wheels and the threshing mechanism and the straw elevator are counterbalanced with relation to the traction wheels by the grain cleaner and bagging devices.

Having thus described the invention, what is claimed as new is:

1. A combined harvester and thresher comprising a wheel mounted frame, a conveyer trunk supported in front of the wheels and extending transversely across the same, a cutting apparatus carried by the said trunk, a thresher located at the delivery end of said trunk and positioned beyond the outer side of one of the traction wheels, a grain cleaner located between the traction wheels, and means for conveying grain from the thresher to the said cleaner.

2. A combined harvester and thresher comprising a wheel mounted frame, a trunk located in front of the wheels and extending transversely across the same, a cutting apparatus carried by the trunk, a thresher located at the delivery end of the trunk and positioned beyond the outer side of one of the wheels, a grain cleaner located between the wheels and in the vicinity of that wheel more remote from the thresher, and means for conveying grain from the thresher to the cleaner.

3. A combined harvester and thresher comprising a wheel mounted frame, a conveyer trunk located in front of the wheels and extending transversely across the same, a cutting apparatus carried by the conveyer trunk, a thresher located at the delivery end of the said trunk and positioned beyond the outer side of one of the wheels, a grain cleaner located between the said wheels, a platform mounted beyond the outer side of the other wheel, and means for conveying the grain from the thresher to the cleaner.

4. A combined harvester and thresher comprising a wheel mounted frame, a conveyer trunk located in front of the wheels and extending transversely across the same, a cutting apparatus carried by said trunk, a thresher located at the delivery end of the trunk and positioned beyond the outer side of one of the wheels, a straw conveyer connected with the delivery end of the thresher, a grain cleaner located between the wheels, and means for conveying the grain from the thresher to the said cleaner.

5. A combined harvester and thresher comprising a wheel mounted frame, a conveyer trunk located in front of the wheels and extending transversely across the same, a cutting apparatus carried by the trunk, a thresher located at the delivery end of the trunk and positioned beyond the outer side of one of the wheels, a grain cleaner located between the wheels, a chute arranged to convey unthreshed heads from the said cleaner to the said conveyer trunk, and means for conveying the grain from the thresher to the cleaner.

6. A combined harvester and thresher comprising a wheel mounted frame, a conveyer trunk located in front of the wheels and extending transversely across the same, a cutting apparatus carried by the trunk, a thresher located at the delivery end of the trunk and positioned beyond the outer side of one of the traction wheels, a straw conveyer connected with the delivery end of the thresher, a grain cleaner located between the supporting wheels, a chute arranged to convey unthreshed heads from the cleaner to the conveyer trunk, and means for conveying the grain from the thresher to the cleaner.

7. A combined harvester and thresher comprising a wheel mounted frame, a trunk located in front of the wheels and extending transversely across the same, a cutting apparatus carried by the trunk, a thresher located at the delivery end of the trunk and positioned beyond the outer side of one of the supporting wheels, a spreader located in the thresher and arranged to operate upon the material as it is delivered from the conveyer trunk, a grain cleaner located between the wheels, and means for conveying the grain from the thresher to the cleaner.

8. A combined harvester and thresher comprising a wheel mounted frame, a conveyer trunk located in front of the wheels and extending transversely across the same, a cutting apparatus carried by the said trunk, a thresher located at the delivery end of the conveyer trunk and positioned beyond the outer side of one of the wheels, a grain auger located in said thresher, a concave located in the thresher and having spaced fingers which extend over the auger, a grain cleaner located between the supporting wheels, and means for conveying grain from the thresher to the cleaner.

9. A combined harvester and thresher comprising a wheel mounted frame, a conveyer trunk located in front of the wheels and extending transversely across the same, a cutting apparatus carried by the conveyer trunk, a thresher located at the delivery end of the conveyer trunk and positioned beyond the outer side of one of the wheels, a grain auger located in said thresher, a straw trunk located at the delivery end of the thresher and having bars mounted for reciprocation, said bars carrying spaced fingers which extend over said auger, a grain cleaner located between the wheels, and means for conveying the grain from the thresher to the cleaner.

10. A combined harvester and thresher comprising a wheel mounted frame, a conveyer trunk located in front of the wheels and extending transversely across the same, a cutting apparatus carried by the conveyer trunk, a thresher located at the delivery end of the conveyer trunk and positioned beyond the outer side of one of the wheels, a concave located in said thresher, a straw trunk connected with the delivery end of the thresher, bars mounted for reciprocation in the last mentioned trunk, a grain auger located in the thresher between the concave and the said bars, spaced fingers carried by the concave and the bars and projecting over the auger, a grain cleaner located between the wheels, and means for conveying the grain from the thresher to the cleaner.

In testimony whereof I affix my signature in presence of two witnesses.

THOMAS DUGAN. [L. S.]

Witnesses:
T. E. ROSE,
W. L. PIERPONT.

---

Copies of this patent may be obtained for five cents each, by addressing the "Commissioner of Patents, Washington, D. C."